June 3, 1969   H. GREBER   3,448,222
AERIAL CONDUCTOR
Filed Dec. 7, 1967
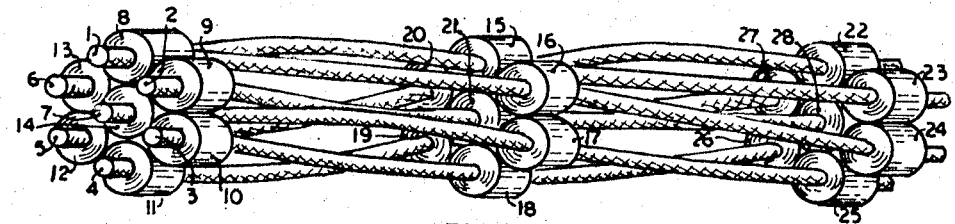
FIG.1
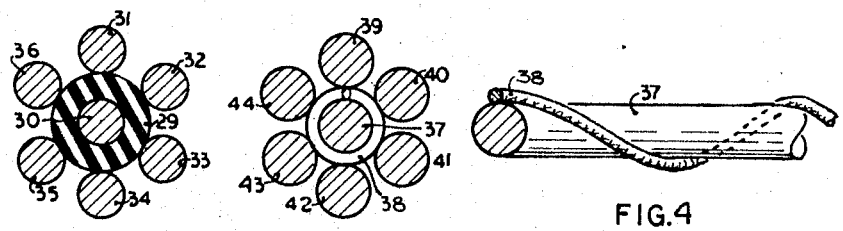
FIG.2   FIG.3   FIG.4
FIG.5   FIG.6
FIG.7   FIG.8
INVENTOR.
Henry Greber United States Patent Office 3,448,222
Patented June 3, 1969

3,448,222
AERIAL CONDUCTOR
Henry Greber, 225 W. 80th St., Apt. 8–D,
New York, N.Y. 10024
Filed Dec. 7, 1967, Ser. No. 688,870
Int. Cl. H01b 11/02; H02g 7/14
U.S. Cl. 174—42      4 Claims

ABSTRACT OF THE DISCLOSURE

This invention relates to an aerial conductor whose strands are separated from each other so that interstices are created between them. This simple means improves the mechanical properties of the conductor, in that it makes it resistance to wind smaller than that of ordinary corresponding conductors, and makes it practically vibration-proof, and also improves the electrical properties of the conductor by increasing its current carrying capacity, through its increased cooling, decreases its inductance, as well as its corona losses, skin effect, and radio and television interference. The separation of the strand wires of the aerial conductor is achieved by means of insulating tapes, preferably of glass braid, or metallic insulated or non-insulated straps wrapped on them. The strand wires are transposed between the spacers for achievement of an even distribution of the current over them.

---

It is well known that the great resistance put by an aerial conductor to the flow of wind around it causes a stress in the conductor as well as in the supporting tower structure. In addition, a wind blowing around a conductor causes its vibration. This is so because the velocity of the wind on the upper and the lower surfaces of the conductor is not the same, due to the different degrees of smoothness of these surfaces. If, for example, the wind velocity on the upper surface is larger than that on the lower, the wind pressure on the lower surface is greater than that on the upper. This pressure difference causes alternate, periodic detachment of air vortices from the two surfaces, which produce vibration of the conductor.

As far as the electrical properties of the aerial conductor are concerned, the compact arrangement of its strand wires decreases its current carrying capacity, and increases its skin effect, which results in an uneven distribution of current over these wires. The inductance of the compact aerial conductor is much larger than that of an equivalent conductor made of the same strand wires with insulating spacers between them. The compact stranded cable has about the smallest diameter for its given cross sectional area. Therefore it has appreciable corona losses, which could be reduced by increasing the cable diameter.

The concept on which this invention is based is very simple. All the mentioned disadvantages of the compactly stranded aerial cable can be remedied, and better mechanical and electrical properties imparted to it by the simple expedient of separating its strands and thereby establishing interstices between them. The mode in which this concept is applied to the different design modifications of an aerial cable can be seen from this specification taken in conjunction with the accompanying drawing.

In this drawing, FIGURE 1 shows a perspective view of an aerial cable with its strand wires separated by means of spacers in form of tapes wrapped on these wires. FIGURE 2, represents a cross section of an aerial cable in which insulating spacers are applied only to its central wire. FIGURE 3, is a cross sectional view, and FIGURE 4 is an elevational view of an aerial cable with a thin insulating wire helically wound on its central strand wire, to separate it from the other strand wires. These are not shown in FIGURE 4, for the sake of clarity. In FIGURES 5 and 6 can be seen two cross sectional views of the same aerial cable, in which only three alternate wires are provided with insulating spacers. In FIGURE 7, showing a cross section of an aerial cable provided with a star-like spacer on its central wire, can be seen that all the strand wires are surrounded with a quoit-like ring. Another cross section of an aerial conductor is given in FIGURE 8, showing one strap wound between all the strand wires.

In detailed consideration of FIGURE 1, it can be seen that each of its strand wires 1, 2, 3, 4, 5, 6, and 7, is provided with spacers 8, 9, 10, 11, 12, 13, and 14. At an interval another set of spacers 15, 16, 17, 18, 19, 20, and 21 is applied. At a still further interval, a third set of spacers 22, 23, 24, 25, 26, 27, and 28 can be seen. These spacers are made of insulating tape wrapped on the strand wires. They can be made of weather-proof plastic, anodized aluminum straps, copper straps covered with enamel, insulating wires and many other materials, preferably however, from glass braids. For their coherence, the strand wires must be helically wound. Preferably, the thickness of the interstices should be equal to about two wire diameters. For high voltage, and particularly for extra voltage aerial cables, the separation between the strand wires must not exceed the above given limit, in order to increase the corona losses. With small separations not exceeding about two wire diameters, the corona losses are decreased, because of the increased overall diameter of the aerial cable. FIGURE 1, also shows an example of the transposition of the strand wires between consecutive spacers. The central strand wire 7 is transposed from the centrally located spacer 14, to the peripheral spacer 17. In the same interval, the peripheral strand wire 2 is transposed from the peripheral spacer 9 to the centrally located spacer 21. While single wires are shown, it is to be understood, that this method and means of separation and transposition of wires can be applied not only to separate strand wires, but also to separate strands. The wires of these strands may or may not be separated from each other and transposed; their separation and transposition being, of course, preferable. The width of the spacers, that it their dimension along the aerial cable, depends on the friction coefficients between the spacers and the strand wires and between the spacers themselves, for a uniform distribution of force over the strand wires.

As shown in the cross sectional view, FIGURE 2, of an aerial conductor, only one spacer 29, placed on the central wire 30, can separate all of its wires 31, 32, 33, 34, 35, and 36, from each other and from the central wire. Similarly, as shown in FIGURES 3 and 4, the central wire 37, can be wrapped helically with an insulating wire 38, in order to separate all the strand wires, 37, 39, 40, 41, 42, 43, and 44, of the aerial cable.

In another design modification, presented in FIGURES 5 and 6, spacers 45, 46, and 47 are mounted on wires 48, 49, and 50. In the consecutive and the preceding intervals, however, spacers 51, 52, and 53 are mounted on wires 54, 55, and 56. Thereby an equal separation is maintained between wires 48, 49, 50, 54, 55, 56, and 57.

As illustrated in the cross sectional view of FIGURE 7, the strand wires 58, 59, 60, 61, 62, 63, and 64, are separated with hexagonal spacer 65, mounted on the central wire 64. Quoit-like ring 66 holds all wires together. Therefore, they do not need to be helically stranded, but can be straight. This makes possible the use of a smaller amount of conductive metal for a given energy transfer capacity of an overhead line. Ring 66 can be replaced with an insulating wire, or with an insulating strap with a buckle, holding all strand wires together.

The same effect can be achieved by means of the configuration shown in FIGURE 8, presenting a cross sectional view of an aerial cable whose strand wires 67, 68, 69, 70, 71, 72, and 73, are separated with strap 74, wound between them. The strand wires can be straight, and shorter than if they were helically stranded.

The mode of operation of this invention is as follows: The air resistance offered by the aerial cable with separated strand wires to the wind flowing around it is decreased in comparison to that of a cable of the same strand wires but in compact arrangement. That this is so can be seen from the fact that the wind flowing through the interstices of the aerial cable creates eddies on its leeside. Most of the air streams in these eddies are directed oppositely to the wind. This is possible, since the wind blows not only around, but also "through" the aerial cable.

The reason why interstices between the strand wires of an aerial cable prevent it from wind-induced vibration can be seen by realizing that the interstices connect the air space above the conductor with that below it. Therefore, any air pressure difference between the upper and lower surfaces of the aerial cable is immediately equalized through the interstices. As a result, vortex formation on the conductor is completely excluded.

That the interstices between the strand wires of the aerial cable increase the cooling effect of the ambient air, and therefore, increase the current carrying capacity to the cable, is obvious. Equally obvious is that the increase of the outside diameter of the aerial cable, due to the interstices between its strand wires, decreases its corona losses, as well as the radio and television interference caused by it. This, however, is true only for comparatively small interstices, not exceeding about two diameter of the strand wire, as far as high voltage and etxra high voltage conductors are concerned. Even small gaps, however, are fully satisfactory for the achievement of the aims set forth in this invention.

Since in an aerial conductor with separated strand wires, these are insulated from each other, they are actually connected in parallel. Therefore, the inductance of the aerial cable equals to that of one of its wires divided by the number of these wires. In approximation, it can be said that by electrical separation of its strand wires, the inductance of the aerial cable with compact strands is decreased in proportion to the number of its strand wires. This amounts to a very substantial decrease of the inductance of the aerial cable, constituting a very decisive advantage, since it increases the stability of the line and reduces its voltage drop.

Regardless whether the spacers are conductive or insulating, the strand wires between them are connected in parallel. But, along the width of a metal spacer, measured in direction of the line, these wires are not insulated and act as a single conductor, whose corona losses and inductance are larger than they were is the strand wires would be insulated along the spacers. As a result, the corona losses and the inductance of aerial conductors with insulating spacers is larger than those of aerial cables with metallic spacers. Consequently, where small corona losses, and particularly where small inductance of the aerial cable are desired, insulating spacers should be used.

Insulating spacers lend themselves to the application of transposition of the strand wires in aerial conductors. Transposition is an effective means to achieve an even distribution of the current over the strand wires, and thereby for the reduction of their effective resistance. This is so because the strand wires on the periphery of an aerial cable enclose more lines of the magnetic flux produced by the current in the conductor, than do the strand wires more centrally located. The counter electromotive force in the latter is, therefore, larger than that in the peripheral strand wires, which is consequence carry a larger share of the total current flowing through the conductor than do the centrally located wires. To avoid this uneven distribution of current over the strand wires they are transposed between consecutive spacers. The transposition of the strand wires is also an effective means against the proximity effect, which as the skin effect, is based on the same physical phenomenon of the appearance of a greater counter electromotive force in spots of the conductor in which the density of the lines of the magnetic flux is larger.

The stranded cable according to this invention can be used not only for overhead transmission, sub-transmission and distribution lines, but also for underground cable lines, communication lines, as well as for windings of electrical machines and transformers. This invention lends itself to many modifications variations and changes. So for example, insulated metallic straps, or alternating metallic and insulating straps can be used for spacers. In some cases, only some strand wires need to be separated. For example, in aluminum cables steel reinforced (ACSR), only the external aluminum strands, but not the steel strands in the core need to be insulated. In such case, the interval between the locations of the spacers, normally equal to about half of the pitch of the wire strands of helixes, can be longer, since the external aluminum wires are expected to carry only a small mechanical load. The same interval can be long in cases when straight wires, not helically wound are used, with spacers as shown in FIGURES 7 and 8. In such cables, if one strand wire is loaded more than the others, it is elongated, and thereby shifts its tensile stress to the other wires. All these modifications, variations and changes are included in the scope and are comprised in the sense of the following claims.

The claims defining this invention are:

1. An aerial conductor whose strand wires are separated from each other by means of spacers mounted on the strand wires of said aerial cable, so that they create interstices between said strand wires, said interstices immediately connecting the air spaces above and below said aerial conductor, so that the detachment of vortices from said conductor when it is exposed to a wind is prevented, and thereby also its wind-induced vibration is excluded, also due to said interstices the wind pressure on said aerial conductor is decreased due to the eddies of the air streams flowing through said interstices, and since, due to the introduction of said interstices, the overall diameter of the aerial cable is increased, its corona loss and the radio and television interference caused by it is decreased, the thickness of said interstices being equal to about two diameter of said strand wires, and the distance between the locations of said spacers being equal to about one half of the pitch of the helix of said strand wires, also because of the strand wires are connected in parallel, the inductance of said aerial cable is approximately equal to that of one strand wire divided by the number of said strand wires, with the strand wires being transposed between consecutive spacers, so that an even distribution of the current flowing through the aerial conductor over its strand wires is achieved.

2. An aerial conductor, as in claim 1, with said spacers made of straps of the metal of which the strand wires of said aerial conductor are made, 3. An aerial conductor as in claim 1, with said spacers made of glass braid tape wound on said strand wires.

4. An aerial conductor as in claim 1, with said spacers consisting of one continuous strap, preferably made of weather-proof plastic, and wound between said strand wires, so as to separate them from each other, said strand wires being straight, not helical as usual.

References Cited
UNITED STATES PATENTS

| | | | |
|---|---|---|---|
| 277,374 | 5/1983 | Strohm | 174—146 |
| 680,150 | 8/1901 | Hultman | 174—146 |
| 2,314,798 | 3/1943 | Peterson | 174—128 |
| 2,639,247 | 5/1953 | Squier | 174—124 |
| 2,993,949 | 7/1961 | Moebius et al. | 174—124 |
| 3,333,044 | 7/1967 | Toto | 174—99 |

LEWIS H. MYERS, *Primary Examiner.*

A. T. GRIMLEY, *Assistant Examiner.*

U.S. Cl. X.R.

174—27, 34, 111